United States Patent
Ando

(10) Patent No.: US 9,272,702 B2
(45) Date of Patent: Mar. 1, 2016

(54) INTERNAL COMBUSTION ENGINE CONTROL FOR A HYBRID VEHICLE

(71) Applicant: Ikuo Ando, Toyota (JP)

(72) Inventor: Ikuo Ando, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/409,648

(22) PCT Filed: Aug. 14, 2013

(86) PCT No.: PCT/IB2013/001774
§ 371 (c)(1),
(2) Date: Dec. 19, 2014

(87) PCT Pub. No.: WO2014/049405
PCT Pub. Date: Apr. 3, 2014

(65) Prior Publication Data
US 2015/0239464 A1    Aug. 27, 2015

(30) Foreign Application Priority Data
Sep. 25, 2012  (JP) .................. 2012-210841

(51) Int. Cl.
*B60W 20/00*  (2006.01)
*F02D 41/02*  (2006.01)
(Continued)

(52) U.S. Cl.
CPC ............ *B60W 20/1084* (2013.01); *B60K 6/445* (2013.01); *B60W 10/06* (2013.01); *B60W 10/08* (2013.01); *B60W 20/10* (2013.01); *B60W 30/194* (2013.01); *B60W 40/12* (2013.01); *F02D 41/0215* (2013.01); *F02D 41/064* (2013.01); *F02D 41/1498* (2013.01); *F02D 41/3094* (2013.01); *B60W 2510/06* (2013.01); *B60W 2510/082* (2013.01); *B60W 2600/00* (2013.01); *B60W 2710/0616* (2013.01); *B60W 2900/00* (2013.01); *F02D 13/0238* (2013.01); *F02D 21/08* (2013.01); *F02D 35/027* (2013.01); *F02D 41/005* (2013.01); *F02D 41/18* (2013.01); *F02D 2041/001* (2013.01); *F02D 2250/18* (2013.01); *F02D 2250/24* (2013.01); *F02D 2250/28* (2013.01); *Y02T 10/6239* (2013.01); *Y10S 903/93* (2013.01)

(58) Field of Classification Search
CPC . B60W 20/1084; B60W 10/08; B60W 10/06; B60W 40/12; B60W 2900/00; B60W 2600/00; B60W 2510/06; B60W 30/194; B60W 20/10; Y10S 903/93; B60K 6/445; F02D 41/0215; F02D 41/3094; F02D 41/1498; F02D 41/064; Y02T 10/6239
See application file for complete search history.

(56) References Cited
U.S. PATENT DOCUMENTS

2005/0098154 A1  5/2005  Ohtani
2006/0207556 A1  9/2006  Miyazaki et al.
(Continued)

FOREIGN PATENT DOCUMENTS

CN       1616809 A    5/2005
CN     101142391 A    3/2008
(Continued)

*Primary Examiner* — Rodney Butler
(74) *Attorney, Agent, or Firm* — Kenyon & Kenyon LLP

(57) ABSTRACT

When an engine is to be started, operation of the engine is started with injection of fuel from a port fuel injection valve, without injecting fuel from an in-cylinder fuel injection valve (S100). If a gear rattling noise is produced (S110), the engine is operated with fuel injection, from the in-cylinder fuel injection valve, without injecting fuel from the port fuel injection valve (S120). This restrains occurrence of a gear rattling noise.

6 Claims, 4 Drawing Sheets

(51) Int. Cl.
| | |
|---|---|
| *F02D 41/06* | (2006.01) |
| *F02D 41/14* | (2006.01) |
| *F02D 41/30* | (2006.01) |
| *B60K 6/445* | (2007.10) |
| *B60W 30/194* | (2012.01) |
| *B60W 10/06* | (2006.01) |
| *B60W 10/08* | (2006.01) |
| *B60W 40/12* | (2012.01) |
| *F02D 41/18* | (2006.01) |
| *F02D 13/02* | (2006.01) |
| *F02D 21/08* | (2006.01) |
| *F02D 35/02* | (2006.01) |
| *F02D 41/00* | (2006.01) |

(56) References Cited

U.S. PATENT DOCUMENTS

2006/0207567 A1  9/2006  Yamaguchi et al.
2006/0254562 A1*  11/2006  Akita ............................ 123/431
2006/0289211 A1  12/2006  Mashiki
2007/0089697 A1*  4/2007  Hara et al. .................. 123/90.15
2008/0147294 A1  6/2008  Tomatsuri et al.
2012/0144907 A1*  6/2012  Komatsu .................... 73/114.51

FOREIGN PATENT DOCUMENTS

| CN | 101198782 A | | 6/2008 |
|---|---|---|---|
| EP | 1531252 A2 | | 5/2005 |
| JP | H06-108908 A | | 4/1994 |
| JP | H07-224699 A | | 8/1995 |
| JP | 2004101400 A | * | 4/2004 |
| JP | 2005-318721 A | | 11/2005 |
| JP | 2005-325825 A | | 11/2005 |
| JP | 2006-258032 A | | 9/2006 |
| JP | 2008-038732 A | | 2/2008 |
| JP | 2008-151064 A | | 7/2008 |
| JP | 2010111212 A | * | 5/2010 |
| JP | 2013-056628 A | | 3/2013 |

* cited by examiner

INTERNAL COMBUSTION ENGINE CONTROL FOR A HYBRID VEHICLE

CROSS-REFERENCE TO RELATED APPLICATIONS

This is a national phase application based on the PCT International Patent Application No. PCT/IB2013/001774 filed Aug. 14, 2013, claiming priority to Japanese Patent Application No. 2012-210841 filed Sep. 25, 2012, the entire contents of both of which are incorporated herein by reference.

1. FIELD OF THE INVENTION

The invention relates to a hybrid vehicle and, more particularly, to a hybrid vehicle that includes: an engine which has an in-cylinder fuel injection valve that injects fuel into a cylinder and a port fuel injection valves that injects'fuel into an intake port and which outputs motive power to a drive shaft connected to an axle shaft; an electric motor that is connected to the drive shaft via a gear mechanism and that outputs motive power to the drive shaft; a battery that supplies electric power to and receives electric power from the electric motor; and a control portion that controls the engine and the electric motor so that demanded drive force for moving the vehicle is output to the drive shaft.

2. DESCRIPTION OF RELATED ART

A hybrid vehicle of this type that has been proposed is a hybrid vehicle equipped with an engine in which fuel can be injected via both an upstream injection provided at an upstream side in an intake passageway and a downstream injector provided at a downstream side in the intake passageway (see, e.g., Japanese Patent Application Publication No. 06-108908 (JP 06-108908 A)). In this hybrid vehicle, at the time of cold start of the engine, fuel is injected from the downstream injector, which is closer to the combustion chamber of the engine, so as to reduce the delay of the injected fuel in reaching the combustion chamber, and after the cold start of the engine, fuel is injected from the upstream injector for good atomization of fuel. In this manner, this hybrid vehicle is intended to be capable of achieving improved responsiveness at the time of cold start of the engine.

However, in a hybrid vehicle equipped with an engine which has an in-cylinder fuel injection valve that injects fuel into a cylinder and a port fuel injection valve that injects fuel into an intake port and which outputs motive power to a drive shaft connected to an axle shaft, and an electric motor that is connected to the drive shaft via a gear mechanism and that outputs motive power to the drive shaft, there is possibility that at the time of cold start of the engine, the combustion state of the engine will become unstable and the torque output from the engine will fluctuate so that a noise, such as a gear rattling noise or the like, may be produced.

The invention provides a hybrid vehicle capable of restraining occurrence of a noise in a gear mechanism when the engine is started in low temperature conditions.

A hybrid vehicle of one aspect of the invention includes: an engine which has an in-cylinder fuel injection valve that injects fuel into a cylinder and a port fuel injection valve that injects fuel into an intake port, and which outputs motive power to a drive shaft connected to an axle shaft; an electric motor that is connected to the drive shaft via a gear mechanism and that outputs motive power to the drive shaft; a battery that supplies electric power to and receives electric power from the electric motor; and a control portion that controls the engine and the electric motor so that demanded drive force for moving the hybrid vehicle is output to the drive shaft. When the engine is started during a cold state, the control portion controls the engine so that the engine is started with fuel injection from the port fuel injection valve, without performing fuel injection from the in-cylinder fuel injection valve. If a noise of the gear mechanism is detected after the engine is started, the control portion executes a noise detection-time fuel injection control which controls the engine so that the engine is operated with the fuel injection from the in-cylinder fuel injection valve, without performing the fuel injection from the port fuel injection valve.

In the hybrid vehicle of the foregoing aspect, when the engine is started during the cold state, the engine is controlled so that the engine is started with the fuel injection from the port fuel injection valve, without performing the fuel injection from the in-cylinder fuel injection valve. This accelerates the atomization and vaporization of fuel and therefore improves the startability of the engine in comparison with a construction in which an engine is started with fuel injection from an in-cylinder fuel injection valve at the time of cold start of the engine. If a noise of the gear mechanism is detected after the engine is started, the control portion executes the noise detection-time fuel injection control which controls the engine so that the engine is operated with the fuel injection from the in-cylinder fuel injection valve, without performing the fuel injection from the port fuel injection valve. In the case where a noise is produced in the gear mechanism when the engine is operated with the fuel injection from the port fuel injection valve, for example, freeze of moisture contained in intake air can sometimes occur on the port fuel injection valve and close the fuel injection opening, so that the combustion state of the engine will become unstable. Thus, the torque output by the engine fluctuates so that the gear mechanism produces a noise. In the case above, the production of the noise from the gear mechanism can be restrained.

In the foregoing aspect, the control portion may detect the noise of the gear mechanism by detecting fluctuation of rotation speed of the electric motor. When the combustion state of the engine is unstable, it is considered that torque fluctuation will occur on the drive shaft and therefore the rotation speed of the electric motor will fluctuate. Therefore, a noise of the gear mechanism can be detected by detecting fluctuation of the rotation speed of the electric motor.

Furthermore, in the foregoing aspect, when a predetermined time has elapsed following start of execution of the noise detection-time fuel injection control, the control portion may control the engine so that the engine is operated with the fuel injection from the port fuel injection valve, without performing the fuel injection from the in-cylinder fuel injection valve. Since exhaust gas sometimes becomes mixed with black smoke if fuel injection from the in-cylinder fuel injection valve is continued, it is preferable to resume fuel injection from the port fuel injection valve in the case of discontinuation of the state in which the gear mechanism produces a noise during the operation of the engine with the fuel injection from the port fuel injection valve. Therefore, mixture of exhaust gas with black smoke can be restrained by controlling the engine so that the engine is operated with the fuel injection from the port fuel injection valve, without performing the fuel injection from the in-cylinder fuel injection valve, when the predetermined time has elapsed following the start of execution of the noise detection-time fuel injection control.

In the foregoing construction, the control portion may execute detection of the noise of the gear mechanism when the predetermined time has elapsed following the start of execution of the noise detection-time fuel injection control. By controlling the engine so that the engine is operated with the fuel injection from the port fuel injection valve, without performing the fuel injection from the in-cylinder fuel injection valve, and also executing the detection of a noise in the gear mechanism at the elapse of the predetermined time following start of execution of the noise detection-time fuel injection control, it becomes possible to restrain mixture of exhaust gas with black smoke and check whether the gear mechanism produces a noise when the engine is operated with the fuel injection from the port fuel injection valve.

Furthermore, in the foregoing aspect, the hybrid vehicle may further include an exhaust gas supply apparatus that performs exhaust gas supply which supplies exhaust gas of the engine to an intake system of the engine.

Still further, in the foregoing aspect, the hybrid vehicle may further include a generator that supplies electric power to and receives electric power from the battery and that outputs motive power and accepts input of motive power, and a planetary gear mechanism whose three rotating elements are connected to three shafts that are the drive shaft, an output shaft of the engine, and a rotating shaft of the generator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described.

Figure 1:
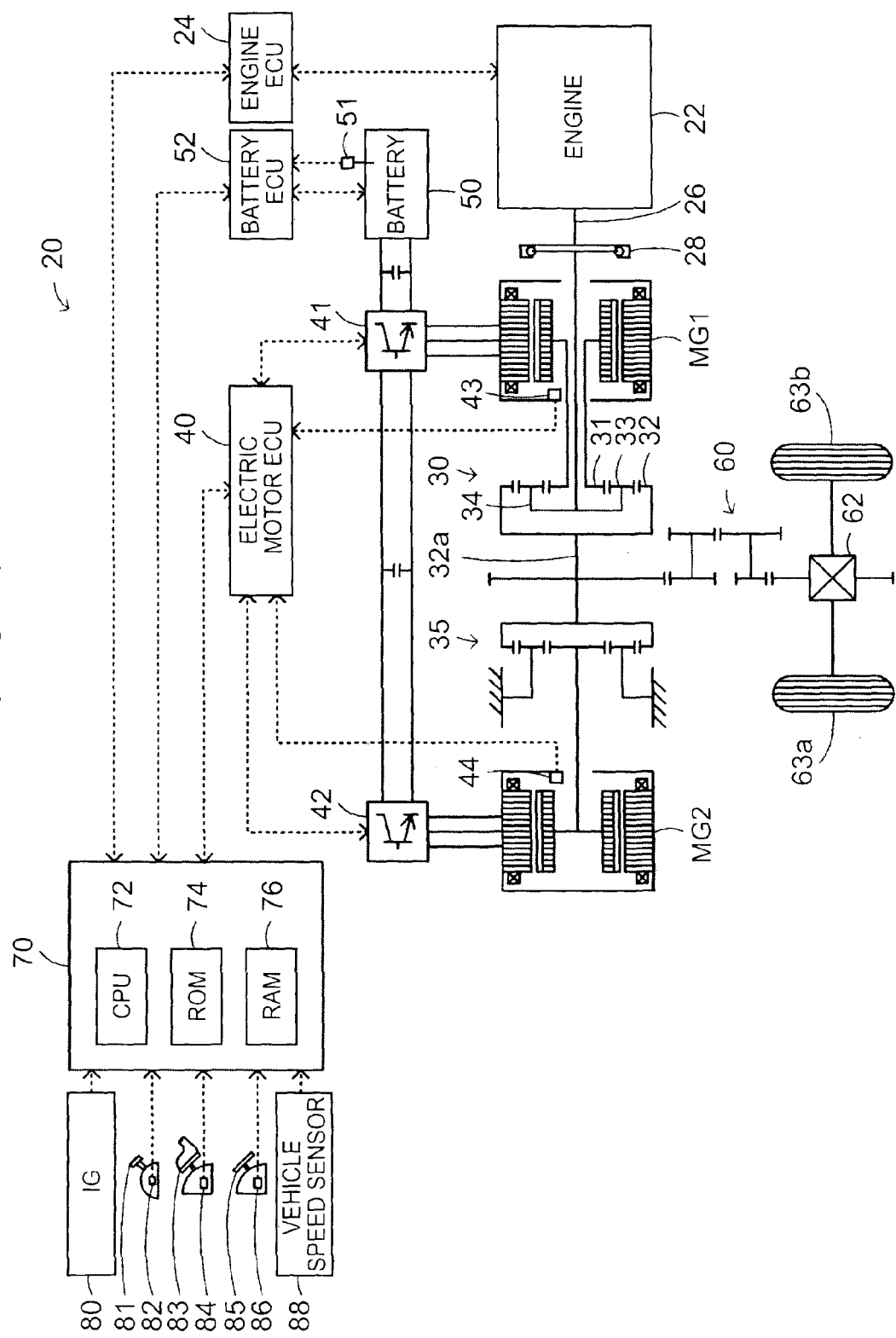
FIG. 1 is a construction diagram showing a general construction of a hybrid motor vehicle 20 as an embodiment of the invention.

FIG. 1 is a construction diagram showing a general construction of a hybrid motor vehicle 20 as an embodiment of the invention. The hybrid motor vehicle 20 of the embodiment, as shown in FIG. 1, includes: an engine 22 constructed as an internal combustion engine that outputs motive power by using gasoline, light oil or the like as a fuel; an engine electronic control unit (hereinafter, referred to as "engine ECU") 24 that controls drive of the engine 22; a three-axis motive power distribution integration mechanism 30 constructed as a planetary gear mechanism whose carrier 34 coupled to a plurality of pinions 33 is connected to a crankshaft 26 as an output shaft of the engine 22 via a damper 28 and whose ring gear 32 is connected to a ring gear shaft 32a as a drive shaft connected to driving wheels 63a, 63b via a differential gear 62 and a gear mechanism 60; an electric motor MG1 which is constructed as, for example, a well-known synchronous generator-motor, and whose rotary element is connected to a sun gear 31 of the motive power distribution integration mechanism 30; an electric motor MG2 which is constructed as, for example, a well-known synchronous generator-motor, and whose rotary element is connected to the ring gear shaft 32a as the drive shaft via a speed-reducing gear 35; inverters 41, 42 for driving the electric motors MG1, MG2; an electric-motor electronic control unit (hereinafter, referred to as "electric motor ECU") 40 that controls drive of the electric motors MG1, MG2 by controlling the inverters 41, 42; a battery 50 that is constructed as, for example, a lithium-ion secondary battery, and that supplies electric power to and receives electric power from the electric motors MG1, MG2 via the inverters 41, 42; a battery electronic control unit (hereinafter, referred to as "battery ECU") 52 that manages the battery 50; and a hybrid electronic control unit (hereinafter, referred to as "HVECU") 70 that controls the entire vehicle.

Figure 2:
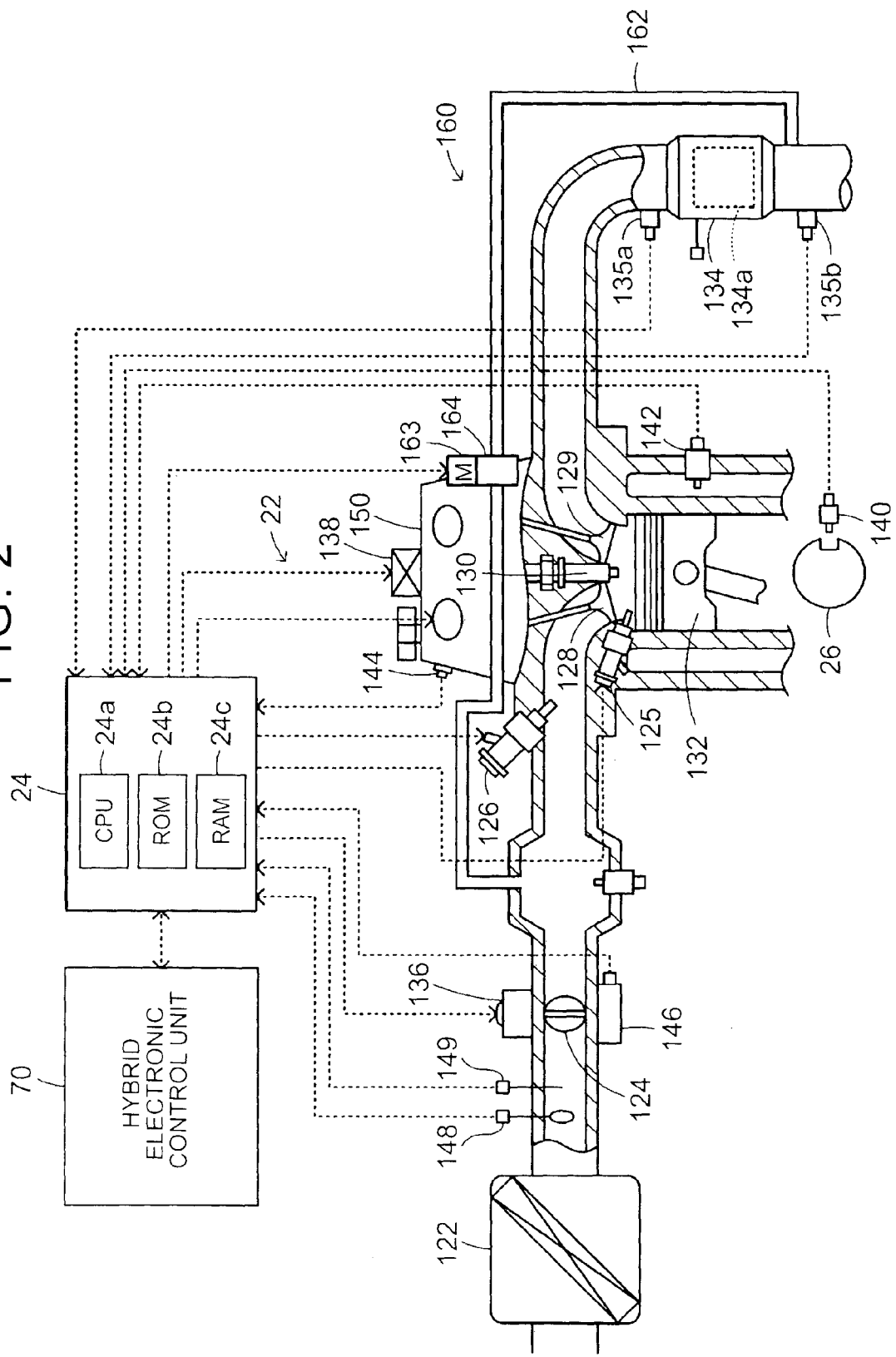
FIG. 2 is a construction diagram showing a general construction of an engine 22.

The engine 22, as shown in FIG. 2, is constructed as an internal combustion engine that includes an in-cylinder fuel injection valve 125 that injects a hydrocarbon fuel, such as gasoline, light oil or the like, directly into a cylinder, and a port fuel injection valve 126 that injects the fuel into an intake port. The operation of the engine 22 is controlled in one of a port injection drive mode, an in-cylinder injection drive mode and a combined injection drive mode by selectively using one or both of the two kinds of fuel injection valves 125, 126. In the port injection drive mode, air having been cleaned by an air cleaner 122 is taken in via a throttle valve 124 and gasoline is injected from the port fuel injection valve 126 into the intake port so that the intake air and the fuel are mixed, and the mixture is taken into the combustion chamber via an intake valve 128, and is exploded and burned by electric spark that an ignition plug 130 produces, and energy of the explosion and combustion of the mixture is used to push a piston 132 down, and the thus-caused reciprocating motion is converted into rotating motion of the crankshaft 26. In the in-cylinder injection drive mode, air is taken into the combustion chamber in the same manner as described above and fuel is injected from the in-cylinder fuel injection valve 125 at an intermediate timing in the intake stroke or after the compression stroke has begun, and then the mixture is exploded and burned by electric spark that the ignition plug 130 produces, whereby rotating motion of the crankshaft 26 is obtained. In the combined injection drive mode, fuel injection from the port fuel injection valve 126 is performed as air is taken into the combustion chamber, and fuel injection from the in-cylinder fuel injection valve 125 is performed during the intake stroke or the compression stroke, whereby rotating motion of the crankshaft 26 is obtained. An appropriate one of these drive modes is entered on the basis of the state of operation of the engine 22, the state of operation demanded of the engine 22, etc. Exhaust gas from the engine 22 is emitted to the outside via an emission control apparatus that has an emission control catalyst (three-way catalyst) that removes pollutants, such as carbon monoxide (CO), hydrocarbon (HC) and nitrogen oxides (NOx), and is also supplied back to the intake side via an EGR (Exhaust Gas Recirculation) system 160. The EGR system 160 includes an EGR pipe 162 connected to a downstream side of the emission control apparatus 134 so as to supply exhaust gas to a surge tank provided at the intake side, and an EGR valve 164 that is disposed in the EGR pipe 162 and that is driven by a stepping motor 163. The EGR system 160 supplies exhaust gas as a non-combustible gas to the intake side while adjusting the amount or flow rate of supply of the gas by adjusting the degree of opening of the EGR valve 164. Thus, the engine 22 is designed so that mixture of air, exhaust gas and gasoline can be sucked into the combustion chamber. Hereinafter, the supplying of exhaust gas of the engine 22 to the intake side will be referred to as EGR.

The engine ECU 24 is constructed as a microprocessor whose central component is a CPU 24a, and includes, besides the CPU 24a, a ROM 24b in which processing programs are stored, a RAM 24c for temporarily storing data, input/output ports (not shown) and a communication port (not shown). The engine ECU 24 accepts, via the input port, input of signals from various sensors for detecting the state of the engine 22, including a crank position θcr from a crank position sensor 140 that detects the rotational position of the crankshaft 26, a coolant temperature Tw from a coolant temperature sensor 142 that detects the temperature of coolant of the engine 22, an in-cylinder pressure Pin from a pressure sensor attached within the combustion chamber, a cam angle from a cam position sensor 144 that detects the rotational position of an intake camshaft that opens and closes the intake valve 128 for intake into the combustion chamber and of an exhaust camshaft that opens and closes an exhaust valve for exhaust from the combustion chamber, a throttle opening degree TH from a throttle valve position sensor 146 that detects the position of the throttle valve 124, an intake air flow rate Qa from an air flow meter 148 that is attached to an intake pipe and that detects the mass flow rate of intake air, an intake air temperature Ta from a temperature sensor 149 attached to the intake pipe, a catalyst temperature θc from a temperature sensor 134a that detects the temperature of the three-way catalyst of the emission control apparatus 134, an air/fuel ratio AF from an air/fuel ratio sensor 135a attached to an exhaust system, an oxygen signal O2 from an oxygen sensor 135b attached to the exhaust system, a knock signal Ks from a knock sensor that is attached to a cylinder block and that detects vibration caused by occurrence of knocking, an EGR valve opening degree EV from an EGR valve opening degree sensor that detects the degree of opening of the EGR valve 164, etc. The engine ECU 24 outputs, via the output port, various control signals for driving the engine 22, for example, a drive signal for the in-cylinder fuel injection valve 125, a drive signal for the port fuel injection valve 126, a drive signal for a throttle electric motor 136 that adjusts the position of the throttle valve 124, a control signal for an ignition coil 138 integrated with an igniter, a control signal for a variable valve timing mechanism 150 capable of changing the opening and closing timings VT of the intake valve 128, a drive signal for the stepping motor 163 that adjusts the degree of opening of the EGR valve 164, etc. Furthermore, the engine ECU 24 communicates with the HVECU 70, and controls operation of the engine 22 by a control signal from the HVECU 70, and outputs data regarding the state of operation of the engine 22 to the HVECU 70 according to need. Incidentally, the engine ECU 24 computes the number of rotations of the crankshaft 26, that is, the rotation speed Ne of the engine 22, on the basis of the signal from the crank position sensor 140 attached to the crankshaft 26, computes a volumetric efficiency (the ratio of the volume of air actually taken into the combustion chamber during one cycle to the piston displacement per cycle of the engine 22) KL on the basis of the intake air flow rate Qa from the air flow meter 148 and the rotation speed Ne of the engine 22, computes the opening-closing timing VT of the intake valve 128 on the basis of the angle (θc1-θcr) of the cam angle θci of the intake camshaft of the intake valve 128 from the cam position sensor 144 relative to the crank angle θcr from the crank position sensor 140; computes the knock intensity Kr that indicates the occurrence level of knocking on the basis of the magnitude and waveform of the knock signal Ks from the knock sensor, and computes the EGR rate Re as the ratio of the EGR flow rate Ve to the sum of the EGR flow rate Ve and the intake air flow rate Qa of the engine 22 on the basis of the intake air flow rate Qa from the air flow meter 148, the EGR valve opening degree EV from the EGR valve opening degree sensor and the rotation speed Ne of the engine 22.

The electric motor ECU 40 is constructed, although not shown, as a microprocessor whose central component is a CPU, and includes, besides the CPU, a ROM in which processing programs are stored, a RAM for temporarily storing data, input/output ports and a communication port. The electric motor ECU 40 accepts input of signals necessary to control drive of the electric motors MG1, MG2, for example, rotational positions θm1, θm2 from rotational position detection sensors 43, 44 that detect rotational positions of the rotary elements of the electric motors MG1, MG2, phase currents applied to the electric, motors MG1, MG2 which are detected by electric current sensors (not shown), etc., via the input port. The electric motor ECU 40 outputs, via the output port, switching control signals to switching elements (not shown) of the inverters 41, 42. The electric motor ECU 40 communicates with the HVECU 70, and controls drive of the electric motors MG1, MG2 by control signals from the HVECU 70, and also outputs to the HVECU 70 data regarding the states of operation of the electric motors MG1, MG2 according to need. Incidentally, the electric motor ECU 40 computes rotational angular speeds ωm1, ωm2 and rotation speeds Nm1, Nm2 of the electric motors MG1, MG2 on the basis of the rotational positions θm1, θm2 of the rotors of the electric motors MG1, MG2 from the rotational position detection sensors 43, 44.

The battery ECU 52 is constructed as a microprocessor that has a CPU as a central component although not shown in the drawings. Besides the CPU, the battery ECU 52 further includes a ROM in which processing programs are stored, a RAM for temporarily storing data, input/output ports and a communication port. The battery ECU 52 accepts input of signals necessary to manage the battery 50, for example, an inter-terminal voltage Vb from a voltage sensor (not shown) disposed between the terminals of the battery 50, a charge/discharge current Ib from an electric current sensor (not shown) attached to an electric power line connected to an output terminal of the battery 50, a battery temperature Tb from a temperature sensor 51 attached to the battery 50, etc. The battery ECU 52 sends to HVECU 70 data regarding the state of the battery 50 according to need. Furthermore, in order to manage the battery 50, the battery ECU 52 computes a charge storage ratio (state of charge) SOC that is the ratio of the amount of electric power dischargeable from the battery 50 to the total capacity of the battery 50 on the basis of the integrated value of the charge/discharge current Ib detected by the electric current sensor, and computes input/output limits Win, Wout that are permissible input/output electric powers that are allowed to be charged into and discharged from the battery 50, on the basis of the charge storage ratio SOC computed and the battery temperature Tb. Incidentally, the input/output limits Win, Wout of the battery 50 are set by setting basic values of the input/output limits Win, Wout on the basis of the battery temperature Tb, and setting an output limiting correction factor and an input limiting correction factor on the basis of the charge storage ratio SOC of the battery 50, and multiplying the set basic values of the input/output limits Win, Wout by the correction factors.

The HVECU 70 is constructed as a microprocessor that has a CPU as a central component. Besides the CPU, the HVECU 70 further includes a ROM in which processing programs are stored, a RAM for temporarily storing data, input/output ports and a communication port. The HVECU 70 accepts, via the input port, input of an ignition signal from an ignition switch 80, a shift position SP from a shift position sensor 82 that detects the operating position of a shift lever 81, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, a vehicle speed V from a vehicle speed sensor 88, etc. As described above, the HVECU 70 is connected to the engine ECU 24, the electric motor ECU 40 and the battery ECU 52 via the communication port, and exchanges various control signals and data with the engine ECU 24, the electric motor ECU 40 and the battery ECU 52.

In the hybrid motor vehicle 20 of the embodiment constructed as described above, a demanded torque Tr* that needs to be output to the ring gear shaft 32a that serves as the drive shaft is calculated on the basis of the vehicle speed V and the accelerator operation amount Acc corresponding to the amount of depression of the accelerator pedal 83 exerted by a driver of the vehicle, and then the engine 22, the operation of the electric motor MG1 and the electric motor MG2 is controlled so that a demanded motive power that corresponds to the demanded torque Tr* is output to the ring gear shaft 32a. Modes of the operation control of the engine 22, the electric motor MG1 and the electric motor MG2 include a torque conversion operation mode, a charge/discharge operation mode, an electric motor operation mode, etc. In the torque conversion operation mode, the operation of the engine 22 is controlled so that the engine 22 outputs a motive power that is appropriate for the demanded motive power, and the drive of the electric motor MG1 and the electric motor MG2 is controlled so that all the motive power that the engine 22 outputs is converted in torque by the motive power distribution integration mechanism 30, the electric motor MG1 and the electric motor MG2, and then is output to the ring gear shaft 32a. In the charge/discharge operation mode, the operation of the engine 22 is controlled so that the engine 22 outputs a motive power that is appropriate for the sum of the demanded motive power and the electric power necessary to charge or discharge the battery 50, and the drive of the electric motor MG1 and the electric motor MG2 is controlled so that a part or all, of the motive power output by the engine 22, with the battery 50 charged or discharged, is converted in torque by the motive power distribution integration mechanism 30, the electric motor MG1 and the electric motor MG2 and therefore the demanded motive power is output to the ring gear shaft 32a. In the electric motor operation mode, an operation control is performed such that operation of the engine 22 is stopped and a motive power from the electric motor MG2 which is appropriate for the demanded motive power is output to the ring gear shaft 32a. Incidentally, the torque conversion operation mode and the charge/discharge operation mode are both a mode in which the engine 22, the electric motor MG1 and the electric motor MG2 are controlled so that the demanded motive power is output to the drive shaft 36, with the engine 22 operated, and are not different from each other in terms of substantial control. Therefore, the two operation modes will hereinafter be collectively termed the engine operation mode.

When the engine 22 is to be operated under load during the engine operation mode, a vehicle-running power Pr* that is demanded for the running of the vehicle is calculated by multiplying the set demanded torque Tr* by the rotation speed Nr of the ring gear shaft 32a (e.g., the rotation speed obtained by dividing the rotation speed Nm2 of the electric motor MG2 by the gear ratio of the speed-reducing gear 35 or the rotation speed obtained by multiplying the vehicle speed V by a conversion factor), and a demanded power Pe* as a power that the engine 22 needs to output is set by subtracting from the calculated vehicle-running power Pr* a charge/discharge demanded power Pb* of the battery 50 obtained on the basis of the state of charge (SOC) of the battery 50. A target rotation speed Ne* and a target torque Te* of the engine 22 are set by using an operation line (e.g., an, optimal fuel economy operation line) that represents a relation between the rotation speed Ne and the torque Te of the engine 22 at which the engine 22 is able to efficiently output the demanded power Pe*. A torque command Tm1* as a torque that the electric motor MG1 needs to output is set, within the range of the input/output limits Win, Wout of the battery 50, by a rotation speed feedback control for causing the rotation speed Ne of the engine 22 to be equal to the target rotation speed Ne*, and a torque command Tm2*, of the electric motor MG2 is set by subtracting from the demanded torque Tr* a torque that acts on the ring gear shaft 32a via the motive power distribution integration mechanism 30 when the electric motor MG1 is driven at the torque command Tm1*. The target rotation speed Ne* and the target torque Te* are sent to the engine ECU 24, and the torque commands Tm1*, Tm2* are sent to the electric motor ECU 40.

After receiving the target rotation speed Ne* and the target torque Te*, the engine ECU 24 sets a target EGR rate Re* as a target value of the EGR rate Re on the basis of the target rotation speed Ne* and the target torque Te*, and sets an injection split ratio Rp that represents the division ratio between (proportions of) the amount of fuel injection from the in-cylinder fuel injection valve 125 and the amount of fuel injection from the port fuel injection valve 126 in the total amount of fuel injection of the engine 22 for efficient operation of the engine 22 on the basis of the rotation speed Ne and the volumetric efficiency KL of the engine 22. The engine ECU 24 performs various controls of the engine 22, including an intake air flow rate control, a fuel injection control through the use of the injection split ratio Rp, an injection control, an opening-closing timing control, etc., in such a manner that the engine 22 is operated at a target operation point that is represented by the target rotation speed Ne* and the target torque Te*, and also performs a driving control of the stepping motor 163 so that the degree of opening of the EGR valve 164 reaches a degree of opening that causes the EGR rate Re to be equal to the target EGR rate Re*.

Furthermore, the electric motor ECU 40, after receiving the torque commands Tm1*, Tm2* for the electric motors MG1, MG2, performs the switching control of the switching elements of the inverters 41, 42 so that the electric motors MG1, MG2 are driven with the torque commands Tm1*, Tm2*. Due to the controls described above, the vehicle can be run or moved by controlling the engine 22, the electric motors MG1, MG2 so that the demanded torque Tr* is output to the ring gear shaft 32a within the range of the input/output limits Win, Wout of the battery 50 while the engine 22 is efficiently operated with the EGR and the fuel injection commensurate with the injection split ratio Rp.

Furthermore, the HVECU 70 compares the demanded power Pe* with an engine-start threshold value Pstart for starting the engine 22 and an engine-stop threshold value Pstop for stopping operation of the engine 22. If the demanded power Pe* exceeds the engine-start threshold value Pstart when the engine 22 is in a stopped state, the HVECU 70 starts the engine 22. If the demanded power Pe* becomes lower than the engine-stop threshold value Pstop when the engine 22 is in operation, the HVECU 70 stops the operation of the engine 22. When the engine 22 is to be started, the HVECU 70 sets the torque command Tm1* for the electric motor MG1 for cranking the engine 22 on the basis of an engine-start torque map for quickly increasing the rotation speed Ne of the engine 22 and the elapsed time t following the beginning of the process of starting the engine 22. The torque command Tm1* is set at a torque that makes it possible to stably crank the engine 22 at or above a rotation speed Nref after the rotation speed Ne of the engine 22 has passed through a resonance rotation speed range or after elapse of a time that is needed for the engine rotation speed Ne to pass through the resonance rotation speed range. When the rotation speed Ne of the engine 22 has reached the rotation speed Nref, the HVECU 70 resets the torque command Tm1* to zero by employing a rate processing, and sends an operation start command to the engine ECU 24 so that the engine ECU 24 starts the fuel injection control and the injection control of the engine 22. After receiving the operation start command, the engine ECU 24 starts the fuel injection control and the injection control of the engine 22.

At this time, a provisional motor torque Tm2tmp that is a provisional value of torque that the electric motor MG2 needs to output is calculated by summing the demanded torque Tr* and a value obtained by dividing the torque command Tm1* by the gear ratio ρ of the motive power distribution integration mechanism 30 and then dividing the sum by the gear ratio Gr of the speed-reducing gear 35. Furthermore, torque limits Tmin, Tmax as lower and upper limits of torque that the electric motor MG2 is permitted to output is calculated by dividing by the rotation speed Nm2 of the electric motor MG2 a deviation between the input/output limits Win, Wout of the battery 50 and an electric power consumption (electric power generation) of the electric motor MG1 obtained by multiplying the set torque command Tm1* by the present rotation speed Nm1 of the electric motor MG1, and the torque command Tm2* for the electric motor MG2 is set by restricting the set provisional motor torque Tm2tmp with the torque limits Tmin, Tmax. Then, the torque commands Tm1*, Tm2* set as described above are sent to the electric motor ECU 40. The electric motor ECU 40, after receiving the torque commands Tm1*, Tm2*, performs a switching control of the switching elements of the inverters 41, 42 so that the electric motors MG1, MG2 are driven with the torque commands Tm1*, Tm2*. Thus, the driving control of the electric motor MG2 is performed so that the demanded torque Tr* is output to the ring gear shaft 32a even during the cranking of the engine 22.

Figure 3:
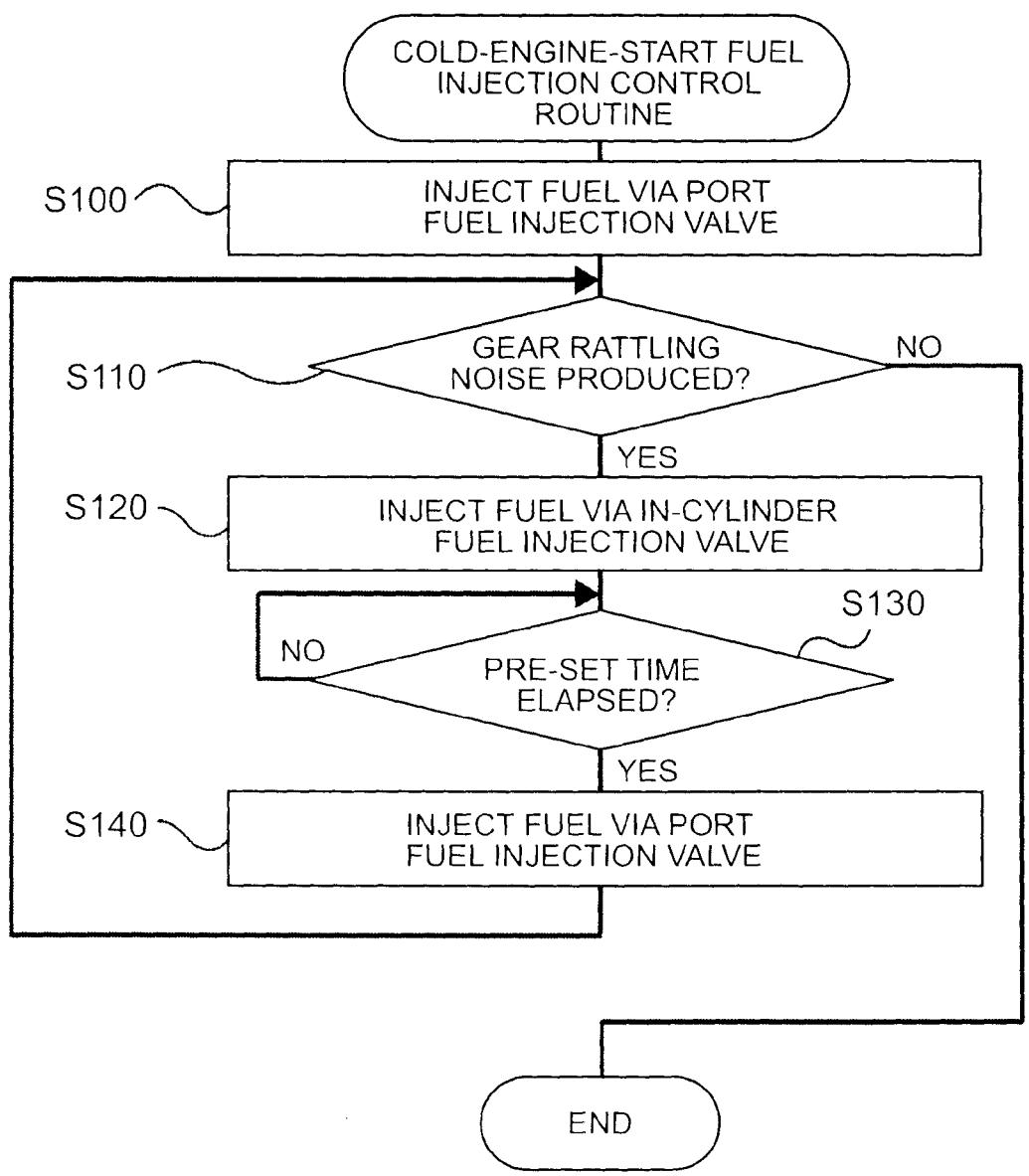
FIG. 3 is a flowchart showing an example of a cold-engine-start fuel injection control routine executed by an engine ECU 24 in the embodiment.

Next, operations of the hybrid motor vehicle 20 of the embodiment constructed as described above and, particularly, the fuel injection control of the engine 22 performed when the engine 22 is started during a cold state in which the atmospheric temperature is low, will be described. FIG. 3 is a flowchart showing an example of a cold-engine-start fuel injection control routine that the engine ECU 24 of the embodiment executes. This routine is executed when the engine ECU 24 receives the operation start command that is sent by the HVECU 70 after the rotation speed Ne of the engine 22 is brought to the rotation speed Nref by the electric motor MG1 cranking the engine 22 during the process of starting the engine 22 which is performed if the demanded power Pe* exceeds the engine-start threshold value Pstart during the stopped state of the engine 22.

When this routine is executed, the engine ECU 24 firstly controls the engine 22 so that the in-cylinder fuel injection valve 125 does not inject fuel but the port fuel injection valve 126 injects fuel (step S100). It is to be noted herein that fuel is injected from the port fuel injection valve 126 at this stage because the injection of fuel from the port fuel injection valve 126 generally accelerates the atomization and vaporization of fuel and therefore improves the startability of the engine 22 in comparison with the injection of fuel from the in-cylinder fuel injection valve 125.

After fuel is injected from the port fuel injection valve 126, the engine ECU 24 subsequently takes in the rotation speed Nm2 of the electric motor MG2 from the HVECU 70, and determines whether the motive power distribution integration mechanism 30 and/or the gear mechanism 60 is producing a gear rattling noise, on the basis of the rotation speed Nm2 of the electric motor MG2 (step S110). The determination as to whether a gear rattling noise is being produced is carried out by pre-setting a change or fluctuation of the rotation speed Nm2 of the electric motor MG2 that involves production of a gear rattling noise in the motive power distribution integration mechanism 30 or the gear mechanism 60 in experiments, analyses or the like beforehand, and then checking whether the current change or fluctuation of the rotation speed Nm2 of the electric motor MG2 is the change (fluctuation) of the rotation speed Nm2 of the electric motor MG2 that involves production of a gear rattling noise. This determination is performed for the following reason. That is, at the time of the cold state, it sometimes happens that the fuel injection opening of the port fuel injection valve 126 is partly closed by deposit of ice or the like so that, a needed amount of fuel injection is not provided and therefore a certain cylinder has a misfire or a lean burn state that is close to the misfire, resulting in torque differences among the cylinders and therefore fluctuations of the torque output by the engine 22. If the torque output by the engine 22 fluctuates, the rotation speed Nm2 of the electric motor MG2 may sometimes fluctuate or the motive power distribution integration mechanism 30 and/or the gear mechanism 60 may sometimes produce a gear rattling noise.

If neither the motive power distribution integration mechanism 30 nor the gear mechanism 60 is producing a gear rattling noise (step S110), the engine ECU 24 determines that it is possible to inject fuel from the fuel injection opening of the port fuel injection valve 126 in a good manner, ends the routine, and then enters the above-described engine operation mode. Thus, the vehicle can run in the engine operation mode promptly following the startup of the engine 22.

However, if the motive power distribution integration mechanism 30 and/or the gear mechanism 60 is producing a gear rattling noise (step S110), the engine ECU 24 determines that the fuel injection opening of the port fuel injection valve 126 is partly closed by deposit of ice or the like, and controls the engine 22 so that the port fuel injection valve 126 does not inject fuel but the in-cylinder fuel injection valve 125 injects fuel (step S120). After that, the engine ECU 24 determines whether a predetermined time Tref has elapsed following the fuel injection from the in-cylinder fuel injection valve 125 (step S130). It is to be noted herein that the predetermined time Tref is a time that is set beforehand as a time that is needed for the ice deposit on the port fuel injection valve 126 to melt due to the EGR and/or the coolant of the engine 22 when the engine 22 is operated with fuel injection from the in-cylinder fuel injection valve 125. That is, the process of step S130 is a process of determining whether the ice deposit on the port fuel injection valve 126 has melted. Thus, by controlling the engine 22 so that fuel is injected from the in-cylinder fuel injection valve 125 for the predetermined time Tref, the melting of the deposit of ice or the like on the port fuel injection valve 126 can be accelerated, and therefore production of a gear rattling noise in the motive power distribution integration mechanism 30 or the gear mechanism 60 can be restrained.

After the predetermined time Tref elapses following the start of the injection of fuel from the in-cylinder fuel injection valve 125 (step S130), the engine ECU 24 controls the engine 22 so that the injection of fuel from the in-cylinder fuel injection valve 125 stops and the engine 22 is operated with fuel injection only from the port fuel injection valve 126 (step S140). If the operation of the engine 22 with the fuel injection only from the in-cylinder fuel injection valve 125, it sometimes happens that the engine 22 emits exhaust gas mixed with black smoke. In order to restrain emission of exhaust gas mixed with black smoke, the fuel injection only from the port fuel injection valve 126 is resumed when the predetermined time Tref elapses. Due to this process, the emission of exhaust gas mixed with black smoke can be restrained.

After the fuel injection from only the port fuel injection valve 126 is resumed, the process returns to step S110. The process of steps S110 to S140 is repeated until in step S110 it is determined that neither the motive power distribution integration mechanism 30 nor the gear mechanism 60 is producing a gear rattling noise. This makes it possible to accelerate the melting of deposit of ice or the like on the fuel injection opening of the port fuel injection valve 126 and to restrain emission of exhaust gas mixed with black smoke.

In the hybrid motor vehicle 20 of the embodiment described above, when the engine 22 is started during the cold state, operation of the engine 22 is started with injection of fuel, from the port fuel injection valve 126, without injecting fuel from the in-cylinder fuel injection valve 125, and then the engine 22 is operated with injection of fuel only from the port fuel injection valve 126. If at this time, a gear rattling noise is produced from the motive power distribution integration mechanism 30 or the gear mechanism 60, the engine 22 is operated with fuel injection from the in-cylinder fuel injection valve 125, without injecting fuel from the port fuel injection valve 126, for a predetermined time Tref. This restrains production of a gear rattling noise from the motive power distribution integration mechanism 30 or the gear mechanism 60. Then, after the predetermined time Tref elapses, fuel injection from the port fuel injection valve 126 is resumed, so that emission of exhaust gas mixed with black smoke can be restrained.

In the hybrid motor vehicle 20 of the embodiment, after the fuel injection from only the port fuel injection valve 126 is resumed following the switch from the fuel injection from the port fuel injection valve 126 to the fuel injection from the in-cylinder fuel injection valve 125, the process returns to step S110. After that, the process of steps S110 to S140 is repeated until it is determined in step S110 that a gear rattling noise is not being produced either the motive power distribution integration mechanism 30 or the gear mechanism 60. However, it is also permissible to adopt a construction in which after the switch from the fuel injection from the port fuel injection valve 126 to the fuel injection from the in-cylinder fuel injection valve 125, the fuel injection from the in-cylinder fuel injection valve 125 is continued for a time that is sufficiently long for ice deposit on the port fuel injection valve 126 to melt, and then the routine is ended without returning to step S110.

Although in the hybrid motor vehicle 20 of the embodiment, the engine 22 is provided with the EGR system 160, the EGR system 160 may be omitted.

Although in the hybrid motor vehicle 20 of the embodiment, the electric motor MG2 is attached to the ring gear shaft 32a as a drive shaft via the speed-reducing gear 35, it is also permissible to adopt a construction in which the electric motor MG2 is connected to the ring gear shaft 32a via a speed changer apparatus (transmission) of two transmission speeds (or gear speeds), three transmission speeds, four transmission speeds, etc.

Figure 4:
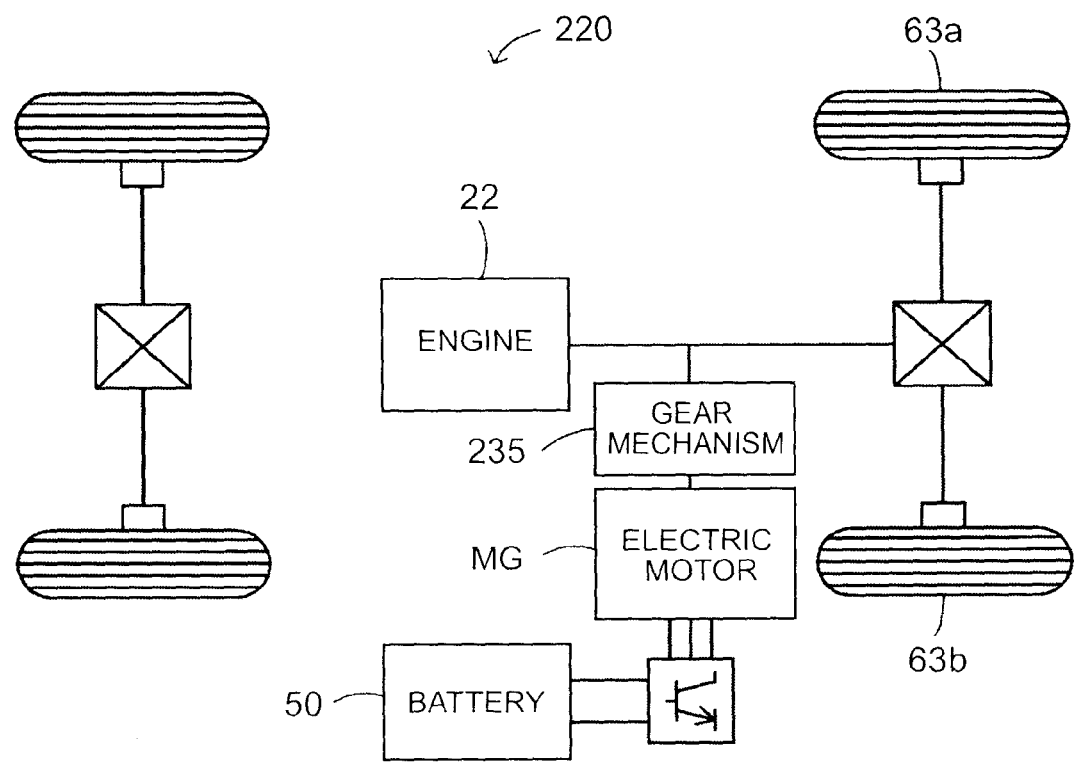
FIG. 4 is a construction diagram showing a general construction of a hybrid motor vehicle 220 as a modification of the embodiment.

In the hybrid motor vehicle 20 of the embodiment, motive power of the engine 22 is output to the ring gear shaft 32a as the drive shaft that is connected to the driving wheels 63a, 63b via the motive power distribution, integration mechanism 30, and motive power of the electric motor MG2 is output to the ring gear shaft 32a via the speed-reducing gear 35. However, it suffices that the hybrid vehicle of the invention is a type of hybrid motor vehicle equipped with an engine that outputs motive power to a drive shaft and an electric motor that outputs motive power to the drive shaft via a gear mechanism. Therefore, it is permissible to adopt a construction as in a hybrid motor vehicle 220 shown as a modification in FIG. 4 in which an electric motor MG is attached, via a gear mechanism 235, such as a speed-reducing gear, a speed changer apparatus (transmission), etc., to a drive shaft connected to driving wheels 63a, 63b, so that motive power of the engine 22 is output to the drive shaft and motive power of the electric motor MG is output to the drive shaft via the gear mechanism 235.

Furthermore, the invention is not limited to applications to hybrid motor vehicles as described above, but is also applicable to vehicles other than the motor vehicles, for example, trains and the like.

Relationships of major elements of the embodiment to major elements of the invention will be described. In the embodiment, the engine 22 is an example of an "engine" provided in the invention, and the electric motor MG2 is an example of an "electric motor" provided in the invention, and the battery 50 is an example of a "battery" provided in the invention. When the engine 22 is to be started during a cold state, operation of the engine 22 is started with fuel injection from the port fuel injection valve 126, without injecting fuel from the in-cylinder fuel injection valve 125, and the engine 22 is operated with fuel injection from the port fuel injection valve 126. If at this time, a gear rattling noise is produced from the motive power distribution integration mechanism 30 or the gear mechanism 60, the engine 22 and the electric motors MG1, MG2 are controlled for a predetermined time Tref so that the engine 22 is operated with fuel injection from the in-cylinder fuel injection valve 125, without injecting fuel from the port fuel injection valve 126, and so that the hybrid vehicle is driven by a demanded torque Tr*. The engine ECU 24, the electric motor ECU 40 and the HVECU 70 combined are an example of a "control portion".

It is to be noted herein that the "engine" in the invention is not limited to the engine 22 constructed as an internal combustion engine that outputs motive power by using gasoline, light oil, etc. as fuel, but may be any kind of engine as long as the engine has an in-cylinder fuel injection valve that injects fuel into a cylinder and a port fuel injection valve that injects fuel into an intake port, and outputs motive power to a drive shaft connected to an axle shaft. The "electric motor" in the invention is not limited to the electric motor MG2 constructed as a synchronous generator-motor, but may be any kind of electric motor, for example, an induction electric motor or the like, as long as the electric motor is connected to a drive shaft via a gear mechanism, and outputs motive power to the drive shaft. The "battery" in the invention is not limited to the battery 50 constructed as a lithium-ion secondary battery, but may be any kind of battery, such as a nickel-hydrogen secondary battery, a nickel-cadmium secondary battery, a lead storage battery, etc., as long as the battery is capable of supplying electric power to and receiving electric power from an electric motor. The "control portion" in the invention is not limited to a combination of the HVECU 70, the engine ECU 24 and the electric motor ECU 40, but may be, for example, constructed of a single electronic control unit. Furthermore, the "control portion" is not limited to a control portion that controls the engine 22 and the electric motors MG1, MG2 so that when the engine 22 is to be started during a cold state, operation of the engine 22 is started with fuel injection from the port fuel injection valve 126, without injecting fuel from the in-cylinder fuel injection valve 125, and if a gear rattling noise is produced from the motive power distribution integration mechanism 30 or the gear mechanism 60 when the engine 22 is operated with fuel injection from the port fuel injection valve 126, the engine 22 is operated with fuel injection from the in-cylinder fuel injection valve 125, without injecting fuel from the port fuel injection valve 126, for a predetermined time Tref, and the hybrid vehicle is moved by a demanded torque Tr*. The "control portion" may be any control portion as long as the control portion controls an engine and an electric motor so that demanded drive force for running or moving the hybrid vehicle is output to a drive shaft, and, when the engine is to be started during the cold state, controls the engine so that the engine is started with fuel injection from a port fuel injection valve, without performing fuel injection from an in-cylinder fuel injection valve, and, if a noise of the gear mechanism is detected after the engine is started, executes a noise detection-time fuel injection control of controlling the engine so that the engine is operated with the fuel injection from the in-cylinder fuel injection valve, without performing the fuel injection from the port fuel injection valve.

Incidentally, the correspondence relationships between major elements of the embodiment and major elements of the claimed invention do not limit the elements of the claimed invention, since the embodiment is a mere example for concretely illustrating forms for carrying out the claimed invention. That is, it is to be understood that the claimed invention should be interpreted on the basis of what is described in the claims, and that the embodiment is merely a concrete example of the claimed invention.

While forms for carrying out the invention have been described with reference to embodiments and the like, it should be apparent that the invention is not limited to these embodiments or the like at all, but can be carried out in various forms without departing from the gist of the invention.

The invention is applicable to a hybrid vehicle-manufacturing industry, and the like.

What is claimed is:

1. A hybrid vehicle comprising:
   an engine including an in-cylinder fuel injection valve that injects fuel into a cylinder and a port fuel injection valve that injects fuel into an intake port, the engine being configured to output motive power to a drive shaft connected to an axle shaft;
   an electric motor connected to the drive shaft via a gear mechanism, the electric motor being configured to output motive power to the drive shaft;
   a battery configured to supply electric power to the electric motor and receive electric power from the electric motor; and
   an electronic control unit programmed to:
   (a) control the engine and the electric motor such that a demanded drive force for moving the hybrid vehicle is output to the drive shaft,
   (b) when the engine is started during a cold state, control the engine such that the engine is started with a fuel injection from the port fuel injection valve, without performing a fuel injection from the in-cylinder fuel injection valve,
   (c) when a noise of the gear mechanism is detected after the engine is started, execute a noise detection-time fuel injection control which controls the engine such that the engine is operated with the fuel injection from the in-cylinder fuel injection valve, without performing the fuel injection from the port fuel injection valve,
   (d) continue execution of the noise detection-time fuel injection control until a predetermined time elapses, the predetermined time being a time that is set beforehand and is needed for an ice deposit on the port fuel injection valve to melt.

2. The hybrid vehicle according to claim 1, wherein
   the electronic control unit is programmed to detect the noise of the gear mechanism by detecting a fluctuation of a rotation speed of the electric motor.

3. The hybrid vehicle according to claim 1, wherein
   when a predetermined time has elapsed following a start of an execution of the noise detection-time fuel injection control, the electronic control unit is programmed to control the engine such that the engine is operated with the fuel injection from the port fuel injection valve, without performing the fuel injection from the in-cylinder fuel injection valve.

4. The hybrid vehicle according to claim 1, further comprising:
   an exhaust gas supply apparatus configured to supply an exhaust gas of the engine to an intake system of the engine.

5. The hybrid vehicle according to claim 1, further comprising:
   a generator configured to supply electric power to the battery, receive electric power from the battery output motive power, and accept input of motive power; and
   a planetary gear mechanism having three rotating elements connected to three shafts, the three shafts being the drive shaft, an output shaft of the engine, and a rotating shaft of the generator.

6. The hybrid vehicle according to claim 3, wherein
   the electronic control unit is programmed to execute a detection of the noise of the gear mechanism when the predetermined time has elapsed following the start of the execution of the noise detection-time fuel injection control.

* * * * *